United States Patent
Gradishar

[15] 3,688,582
[45] Sept. 5, 1972

[54] THERMOMETRIC DEVICES

[72] Inventor: Frederick J. Gradishar, 1218 Evergreen Road, Carrcroft Crest, Wilmington, Del. 19803

[22] Filed: Feb. 27, 1970

[21] Appl. No.: 15,148

[52] U.S. Cl. .................................73/371, 73/358
[51] Int. Cl. ......................G01k 5/00, G01k 5/22
[58] Field of Search........73/371, 376, 363, 343, 358, 73/368.3

[56] References Cited

UNITED STATES PATENTS

| | | | |
|---|---|---|---|
| 805,304 | 11/1905 | Kuch | 73/371 |
| 1,014,800 | 1/1912 | Balderston | 73/371 |
| 1,793,303 | 2/1931 | Boyer | 73/371 |
| 2,115,502 | 4/1938 | Vernet | 73/368.3 X |
| 2,259,846 | 10/1941 | Vernet et al. | 73/363 X |
| 2,795,140 | 6/1957 | Loeb | 73/371 |
| 3,001,401 | 9/1961 | Vernet et al. | 73/358 |
| 3,350,490 | 10/1967 | LeBeau | 73/371 X |
| 3,465,590 | 9/1969 | Kluth et al. | 73/358 X |
| 3,487,693 | 1/1970 | Weinstein | 73/371 |
| 3,521,489 | 7/1970 | Finkelstein et al. | 73/358 |
| 3,253,466 | 5/1966 | Chough | 73/343 |

Primary Examiner—Louis R. Prince
Assistant Examiner—Daniel M. Yasich
Attorney—Don M. Kerr

[57] ABSTRACT

A thermometer or other device for measuring temperatures within a preselected range which utilizes, as a temperature indicating means, a solid, heat expansible substance which melts and expands continuously over the range. Preferred form is an inexpensive single-use disposable clinical thermometer with a plastic casing and a solid indicating means (e.g. a mixture of n-tricosane and n-nonadecane) which expands linearly during fusion over the temperature range of clinical interest.

16 Claims, 24 Drawing Figures

PATENTED SEP 5 1972 3,688,582

INVENTOR
FREDERICK J. GRADISHAR
BY
ATTORNEY

INVENTOR
FREDERICK J. GRADISHAR
BY *Dan M. Kerr*
ATTORNEY

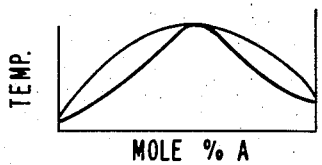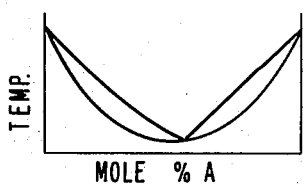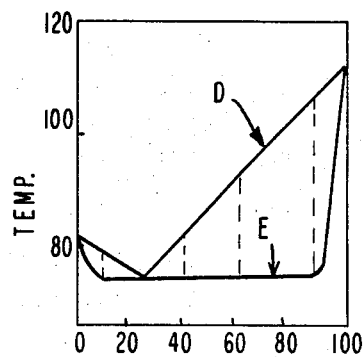
FIG. 8a
FIG. 8b
FIG. 8c
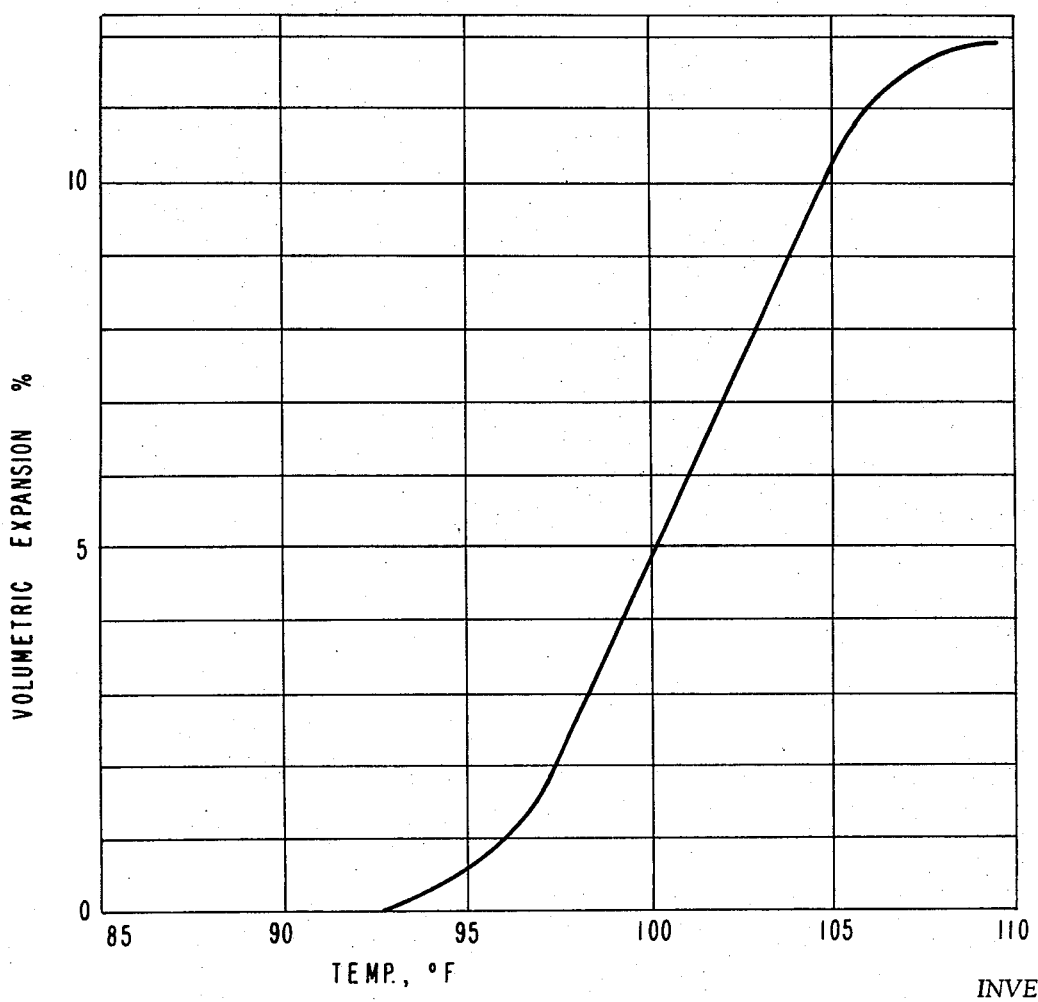
FIG. 9

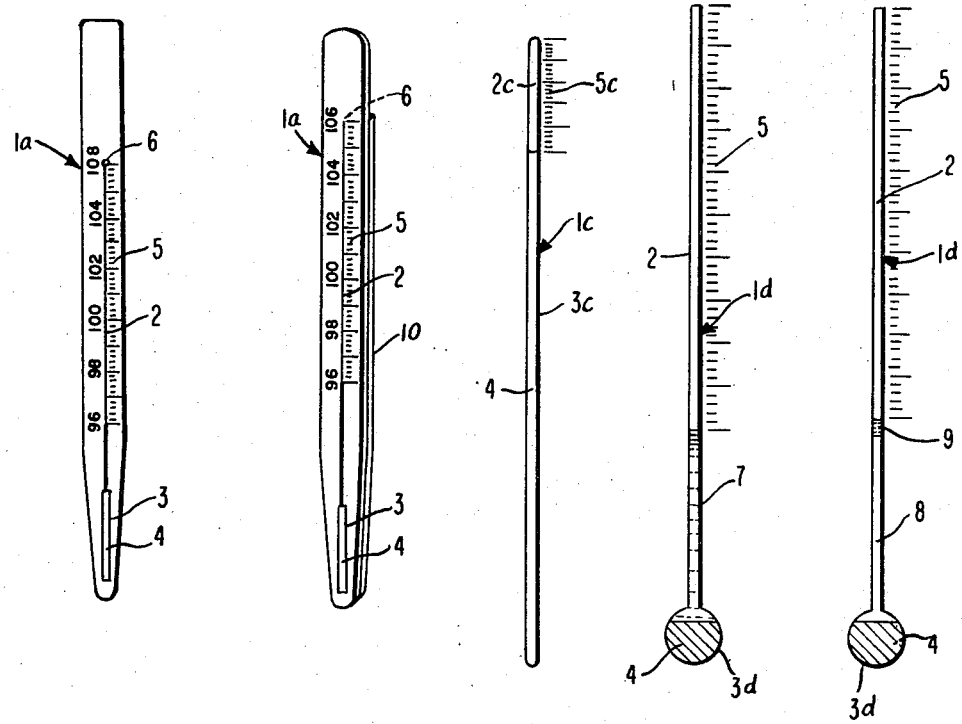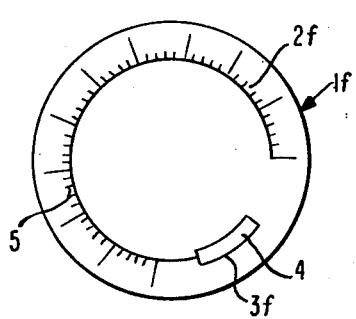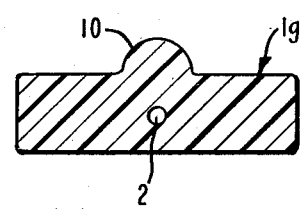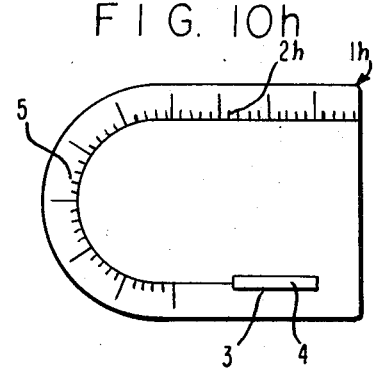

INVENTOR
FREDERICK J. GRADISHAR
BY Don M. Kerr
ATTORNEY

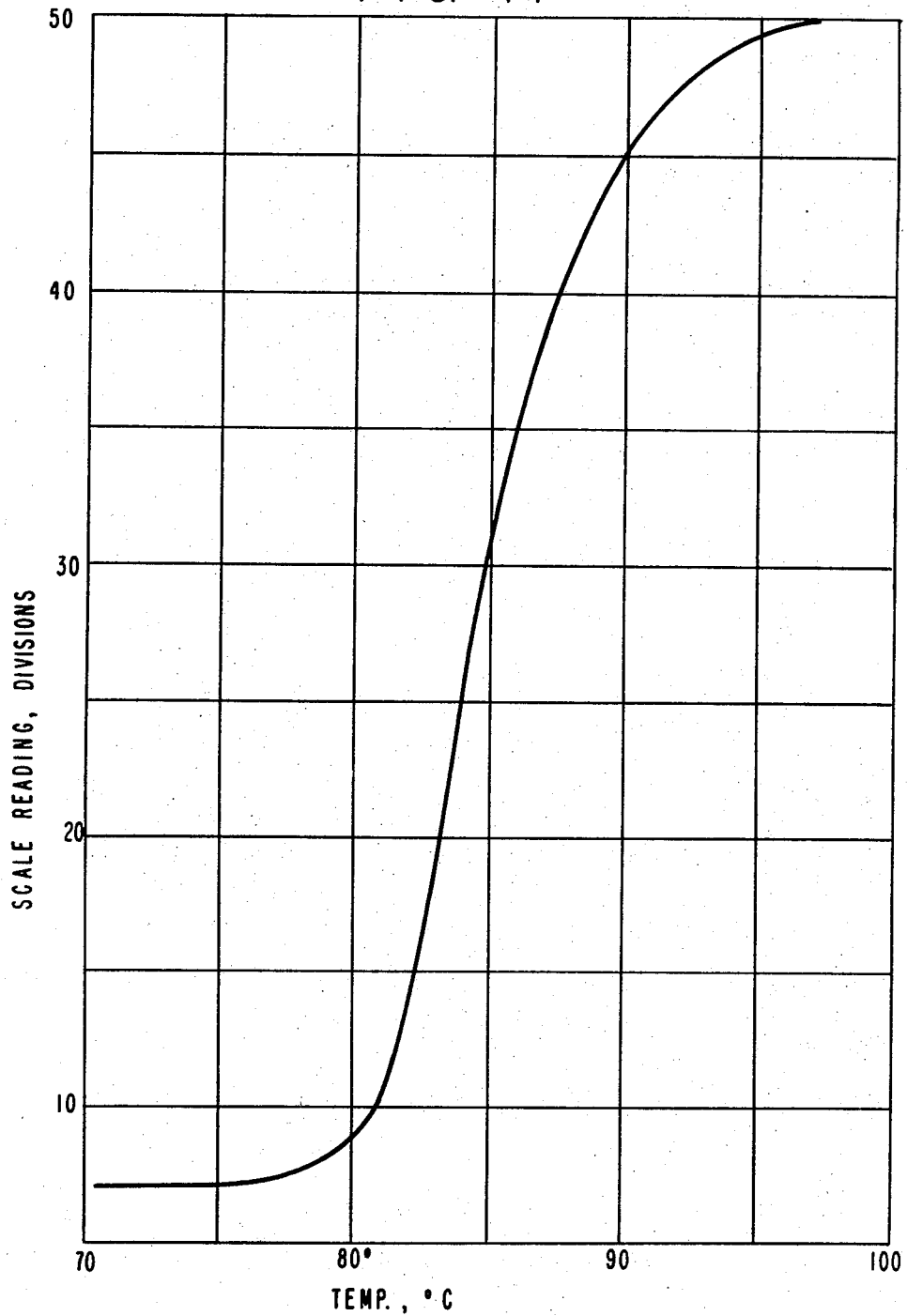

THERMOMETRIC DEVICES

BACKGROUND OF THE INVENTION

This invention relates to thermometers, and is directed to thermometers for measuring temperatures in preselected ranges. While the thermometers of this invention are of general applicability in many fields, they are particularly advantageous in the form of clinical thermometers of either the oral or rectal type, and especially in the form of sterile single-use, disposable, plastic clinical thermometers.

One of the serious limitations of the common mercury-in-glass clinical thermometers is their relative high cost which necessitates re-use. In order to be re-used, the thermometers must be "shaken down;" that is, the mercury in the capillary bore must be reset to a value below, say, 96° F. In hospitals, this is often performed in a centrifuge at a location removed from the patient's floor. The thermometer must also be resterilized prior to re-use. Because of the nature of the glass thermometers, heat cannot be used and the use of sterilizing liquids is not always reliable, creating fears of cross-contamination of infections from one patient to another. In any case, the "shaking down" and sterilizing operations are time-consuming of labor. Also, the usual glass-enclosed thermometers are easily broken so that they present an additional item of considerable expense in a hospital or clinic.

The high cost of manufacture of mercury-in-glass clinical thermometers is inherent in the characteristics of both mercury (or other expansible liquids) as well as glass. The complexity of manufacture is illustrated by the multiplicity of process steps involved; see, for example, U.S. Pat. No. 3,183,721. The difficulties are compounded by the fact that (1) mercury (or other expansible fluid) has a relatively low coefficient of thermal expansion which required very close tolerances in dimensions for the bulb and capillary; (2) the mercury expands uniformly over the range from the base temperature (say, room temperature) to the usual temperature being read, yet the span of clinical interest is relatively short, 96° F. to 106° F.; (3) after removing the thermometer, the mercury tends to retract rapidly upon cooling (it is customary to insert a constriction in the capillary bore to hold the "maximum reading" until the thermometer is "shaken down" for re-use); (4) the glass casing must be tediously annealed to remove stresses during manufacture; and (5) the thermometers must be individually calibrated and marked (temperature scale applied).

Clinical thermometers comprising a heat expansible liquid (e.g., mercury) in a plastic casing have been proposed (U.S. Pat. Nos. 3,350,490 and 2,795,140), but as far as is known have not been distributed commercially. A probable limitation of this type of thermometer resides in the fact that the coefficient of expansion of most plastics is of the same order of magnitude as that of the expansible liquid, and considerable error is inherent in a thermometer combining an expansible plastic casing with an expansible liquid indicator.

As will be seen from the description to follow, this invention avoids these disadvantages of thermometers based on heat-expansible liquids by using instead a heat expansible solid which melts and expands over the temperature range of interest. Solids which melt with expansion have been proposed heretofore as power elements in various temperature-responsive and electric current-responsive mechanisms such as valves and switches; see, for example, U.S. Pat. Nos. 3,001,401 and 3,263,411 and British Pat. No. 920,929. Also, thermometers which depend upon melting of solids for indicating temperature have been proposed, but these comprise a series of separated, sharp-melting compounds; see, for example, U.S. Pat. Nos. 3,440,882 and 3,430,491. A thermometer or other temperature indicating device which depends upon expansion during fusion of a material which melts over a range of temperatures, as in the present invention, has apparently not been proposed heretofore.

SUMMARY OF THE INVENTION

This invention is a thermometer or other device for measuring temperatures over a preselected range which utilizes a temperature indicating means comprising a solid, heat expansible material which melts over a temperature range inclusive of the preselected range and which expands continuously with increasing temperature over the preselected range. The device includes means for detecting the degree of expansion of the heat expansible material when heated to a temperature within the preselected range and means for correlating the degree of expansion with the temperature.

The coefficient of expansion of the heat expansible solid over the preselected range should be greater than that of the casing material, so that the expansion can be accurately detected. As a practical matter, the coefficient of the heat expansible solid should be greater by a factor of at least 3.

A preferred form of the invention is a single use, disposable clinical thermometer for measuring temperatures over the range of clinical interest. This thermometer includes an elongated casing of a thermoplastic material having a longitudinal capillary bore which communicates at one end with a chamber of larger cross-section than the bore. The temperature indicating means comprises a solid heat expansible material as defined above, preferably one having a coefficient of expansion over the temperature range of clinical interest which is at least 10 times greater than that of the casing material. The temperature indicating means at least partially fills the chamber, and it may extend into the bore. A graduated scale is provided on the casing adjacent the bore. This scale is calibrated to correlate the level of the temperature indicating means within the bore with the temperature of the heat expansible material when heated to a temperature within the range. Preferably, the heat expansible solid material is one which expands linearly with temperature over the range of clinical interest.

BRIEF DESCRIPTION OF THE DRAWINGS

FIGS. 8A, 8B, and 8C are representations of phase diagrams for other fusible, heat expansible solids which can be used.

FIG. 9 is a graph showing the relationship of volume and temperature for a paraffinic heat-expansible material with a non-linear expansion curve.

FIGS. 10a through 10f show some alternate configurations and features for plastic, disposable thermometers of this invention.

FIGS. 11 through 15 are calibration curves for other thermometers of this invention, more fully described in the examples below.

DESCRIPTION OF THE PREFERRED EMBODIMENT

Figure 1:
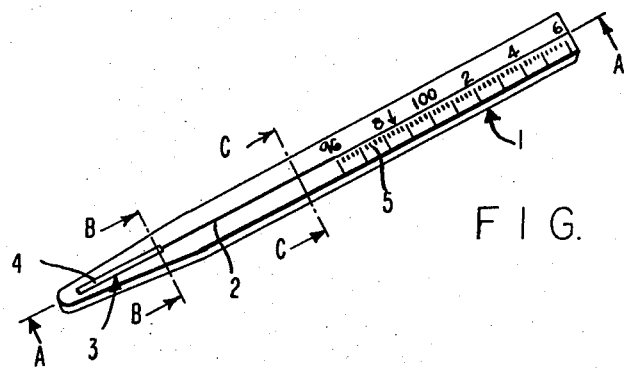
FIG. 1 shows a preferred clinical thermometer of this invention.
Figure 2:
FIGS. 2, 3, and 4 are cross-sectional views of the thermometer of FIG. 1, taken along sections A—A, B—B, and C—C, respectively.
Figure 3:
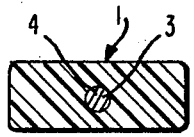

The preferred embodiment of this invention will be described with reference to FIGS. 1 through 7. As shown in FIG. 1, it resembles in appearance the conventional mercury-in-glass clinical thermometer. It includes a clear, rigid, polyvinylchloride shell or casing 1 of general dimensions 2 mm. × 7 mm. × 100 mm., a capillary bore 2 within the shell, a reservoir bulb or chamber 3 at one end of the bore and communicating with the bore, and a solid, heat expansible material 4 in the bulb and optionally extending into the bore, and a calibrated, graduated temperature scale 5 on the casing adjacent the bore.

The preferred heat-expansible material is a binary mixture of 60 parts by weight of n-tricosane ($C_{23}H_{48}$) and 40 parts by weight of n-nonadecane ($C_{19}H_{40}$). Optionally 0.2 parts by weight of Oil Red dye is incorporated into 100 parts of the binary mixture to aid in visual readability. Each of the components in the mixture is purified by fractional crystallization to assure a sharp melting point as well as a uniform temperature-volume expansion response.

n-Tricosane ($C_{23}H_{48}$) and n-nonadecane ($C_{19}H_{40}$) are paraffinic hydrocarbons found naturally, admixed with other homologous compounds, in so-called paraffin wax. The latter is often used in commerce in conjunction with food products and may therefore be considered nontoxic to humans. The paraffins are considered to be decidedly inert and unreactive materials.

Figure 5:
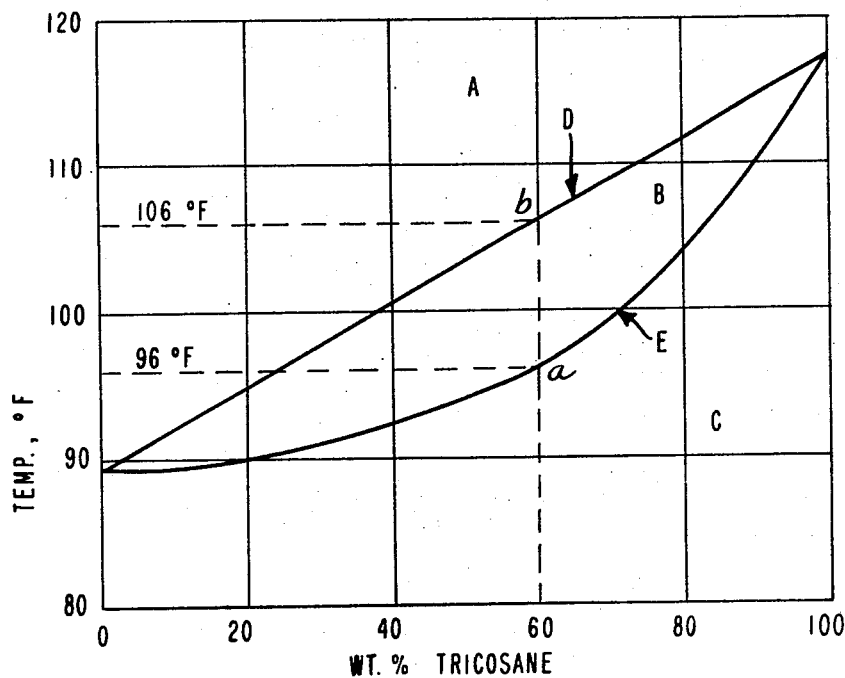
FIG. 5 is an approximate phase diagram for binary mixtures of n-tricosane and n-nonadecane, which are preferred heat expansible materials for use in the clinical thermometer of this invention.

The relationship between the composition of a binary mixture of tricosane and nonadecane and its particular melting and expanding range is best illustrated by its phase diagram shown approximately in FIG. 5. For any given composition, the mixture will begin to melt (and expand) at a fixed temperature (on the solidus line E) and be completely molten and essentially fully expanded at another higher temperature (on the liquidus line D). In the region B, solid and liquid exist in equilibrium. The totally solid phase in region C or the totally liquid phase in region A of course undergoes a small expansion with rising temperatures, but for present purposes this can be neglected in view of the much larger expansion which occurs during the liquid-to-solid phase change.

Figure 6:
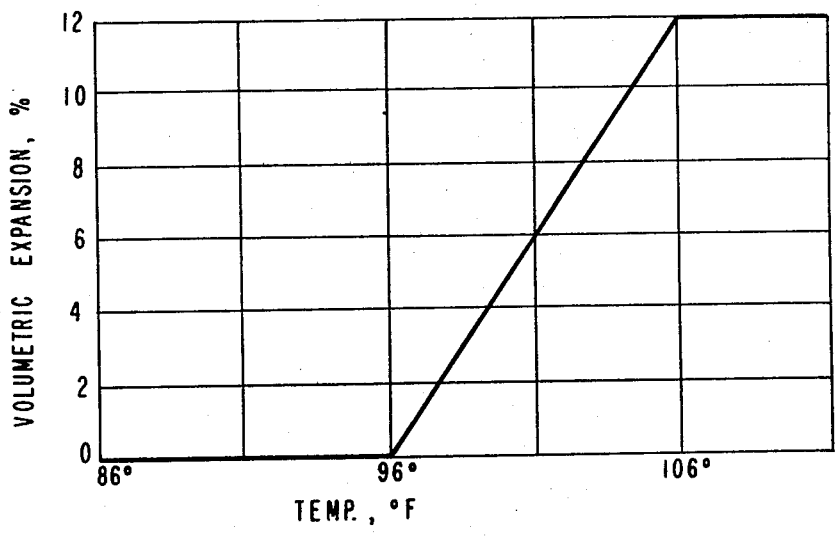
FIG. 6 is a graph showing relationship of volume and temperature over a range of temperatures, including the range of clinical interest, for a binary mixture of 60 weight percent n-tricosane and 40 weight percent n-nonadecane. The volumetric expansion is a linear function of temperature over the range of 96° to 106° F. for this mixture.
Figure 7:
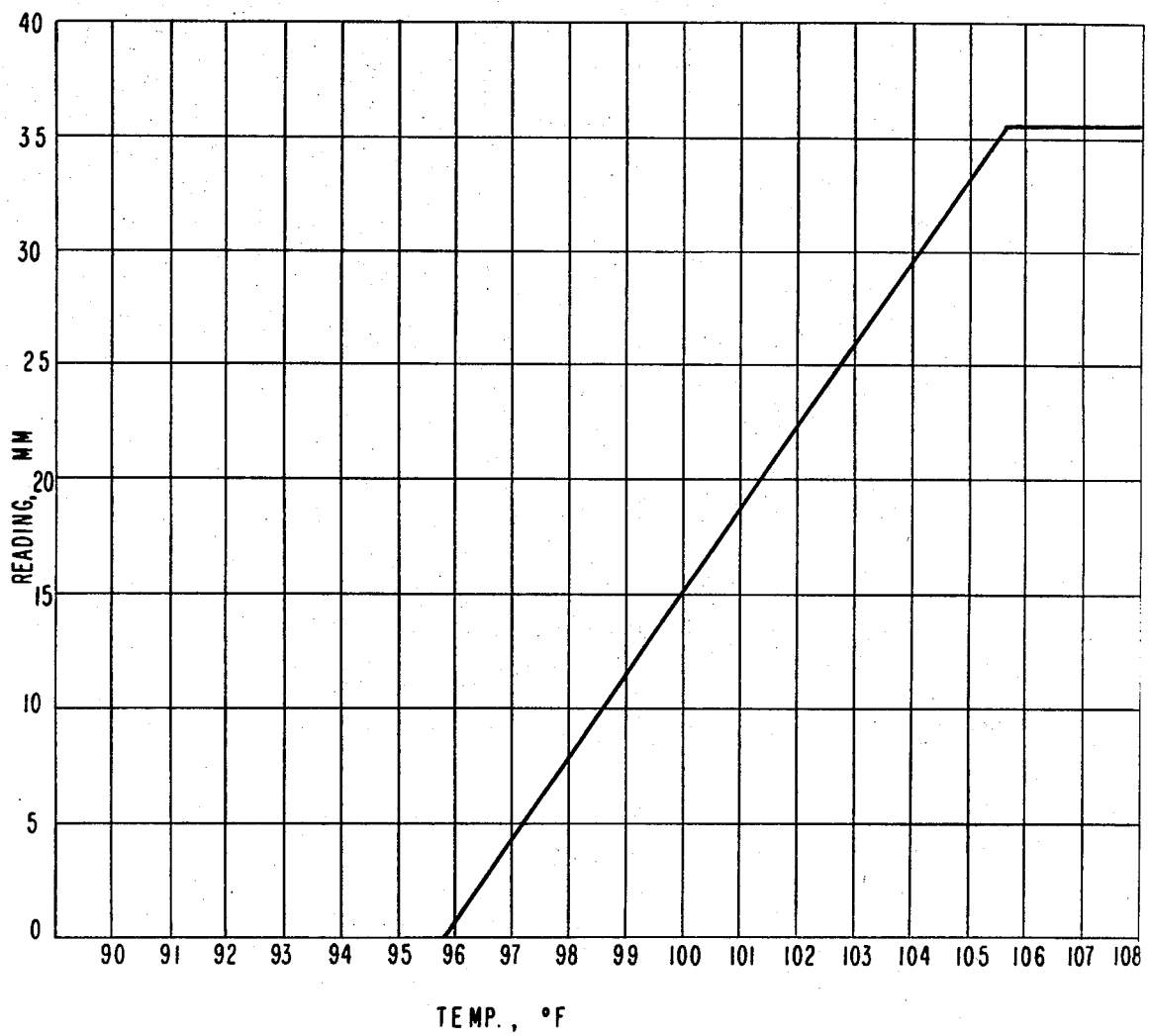
FIG. 7 is a calibration curve for a thermometer of the type shown in FIG. 1 utilizing the 60/40 mixture of tricosane/nonadecane as temperature indicator.

As depicted in FIG. 5, when the temperature of a 60/40 mixture of tricosane and nonadecane is raised, no melting is observed until the temperature reaches about 96° F. (point a) where initial expansion in the volume is also observed. As the temperature is raised further, additional melting and expansion takes place until the mixture is completely molten at about 106° F. (point b). The expansion characteristic of the 60/40 tricosane/nonadecane mixture is shown in FIG. 6 where it can be noted that practically no expansion occurs until the temperature reaches about 96° F., there is rectilinear expansion over the range of about 96° to 106° F., and practically no expansion thereafter.

The preferred embodiment of the invention is further illustrated by Example 1 herein below.

While a number of processes can be used to manufacture the thermometer of the present invention, the following is intended to typify the principal steps used in making a series of clinical thermometers of the embodiment depicted in FIGS. 1 through 4:

1. A 28 mil (0.71 mm.) O.D. steel hypodermic tube and a 5.4 mil (0.137 mm.) nylon monofilament (threaded through the tube) are positioned between two sheets of 25 mil (0.64 mm.) thick clear polyvinylchloride (PVC) sheets.

2. The assembly is compressed in a heated Carver Laboratory Press at 130° C. After cooling the molded shell, the tube and monofilament are withdrawn leaving the bulb and capillary bore cavities.

3. The thermometer shell is then trimmed to the desired shape and the lower bulb end is sealed off in a heated clamp so that the resulting bulb cavity has a length of exactly 0.55 inches (14 mm.)

4. The thermometer is filled with the molten 60/40 tricosane-nonadecane mixture at 110° F. by the customary vacuum technique, in which the open capillary end of the casing is immersed in the melt, a vacuum is drawn above the melt to evacuate the capillary and bulb, then the vacuum is released, causing melt to flow into the bulb and capillary.

5. The filled thermometer is withdrawn from the melt and the tricosane-nonadecane mixture is then contracted toward the bulb end by cooling the bulb while maintaining the upper section of the capillary bore at about 110° F.

6. Finally, a linear temperature scale from 96° to 106° F. is affixed to one side of the flat thermometer with the 96° reading even with the level of the solid paraffin mixture in the bore and the 106° reading at the top of the bore.

A selected set of plastic thermometers prepared in accordance with the above procedure were tested on a human subject with the results shown in Table I below:

TABLE I

Plastic Thermometers - Accuracy in Oral Tests

Test Conditions: Deep under tongue for three minutes
Plastic Thermometer Dimensions: (see FIGS. 1–4)
Bulb (3) = 0.71 mm. ID × 14 mm. inside length Capillary (2) = 0.137 mm. × 50.8 mm. inside length Plastic

| No. | Thermometers Temp. (warm)* °F. | Temp. (R.T.)** °F. | Clinical Temp. (glass) °F. | Error (R.T.—glass) °F. | Time of Day |
|---|---|---|---|---|---|
| 253 | 98.3 | 98.2 | 98.2 | 0.0 | 2:12 |
| 256 | 98.5 | 98.2 | 98.3 | −0.1 | 2:52 |
| 308 | 97.7 | 97.6 | 97.5 | 0.1 | 9:21 |
| 313 | 97.9 | 97.8 | 97.7 | 0.1 | 9:27 |
| 315 | 97.9 | 97.8 | 97.7 | 0.1 | 9:32 |
| 316 | 97.8 | 97.7 | 97.8 | −0.1 | 9:37 |
| 319 | 98.2 | 98.0 | 98.4 | −0.4 | 2:57 |
| 320 | 98.5 | 98.4 | 98.4 | 0.0 | 3:02 |
| 321 | 98.6 | 98.4 | 98.5 | 0.1 | 3:07 |

*Temperature (warm) is the maximum reading immediately after removing from the mouth.
**Temperature R.T.) is the reading after cooling the thermometer to room temperature.

It can be observed from the data of Table I that the reading of the plastic thermometer essentially agrees within ± 0.2° F. of the reading of a high grade mercury-in-glass clinical thermometer, both thermometers being exposed to the test subject at the same time. It will also be observed that the readings taken after the thermometers had cooled to room temperature were essentially the same as the readings taken immediately after removing the thermometer from the subject's mouth. This illustrates an advantageous feature of the preferred embodiment of this invention. Some of the heat expansible material which contacts the cooler walls of the bore freezes out and coats the walls of the bore, thus holding and recording the maximum temperature reading. That is, in the preferred embodiment, the thermometer of this invention is inherently of the maximum reading type. The "retraction error" (that is, the difference between the temperature reading taken immediately after removal of the plastic thermometer from the mouth and the temperature reading taken after the plastic thermometer is cooled) is within 0.2° F., a value acceptable to most users.

The high volumetric expansion (approximately 12 percent) of the paraffinic mixture (shown in FIG. 6) is particularly advantageous in preparing thermometers of this invention because it permits the use of a relatively large bore for a given bulb volume. If mercury were used, the volumetric expansion would be only 1/100th as much over the same temperature range and the capillary would necessarily have to be reduced to 1/100th the volume for the same bulb dimensions.

The thermometer which has been described can be made with sufficient accuracy, uniformity and reliability for clinical use and yet so inexpensively that it can be discarded after a single use, thus eliminating all risk of transmitting disease germs from one user to another. One reason for this is that the bore diameter can be relatively large. The difficulty and expense of making a thermometer case increase in inverse relation with the size of the capillary bore diameter. Another reason is that it is not necessary to provide a constriction in the bore to hold the maximum temperature reading, as previously mentioned, nor is it necessary to anneal the casing to prevent breakage, as in the case of conventional mercury-in-glass thermometers. A further advantage and cost reducing factor is that it is not necessary to test or calibrate each individual thermometer in the manufacturing process. This feature results from the fact that the fusible expansible material retracts in the bore during manufacture to the lowest temperature in its range (say, 96° F.) and will expand only to its maximum temperature point (say, 106° F.) at the fill point. Thus, a uniform scale spanning the temperature range (say, 96° F.–106° F.) will automatically provide an accurate calibration when a heat expansible material which expands linearly during fusion is used.

BRIEF DESCRIPTION OF THE OTHER EMBODIMENTS

Solid Heat Expansible Materials

The selected solid, heat expansible solid material must melt over a range which includes, and preferably which coincides with, the range within which temperatures are to be measured, i.e., the preselected range. It must expand continuously (preferably linearly) with increasing temperature over the preselected range, and it must have a coefficient of expansion over the preselected range which is greater than that of material of construction of the casing. As a practical limit, the ratio of the coefficient of expansion of the heat expansible material to that of the casing material over the range of use should be at least 3. Lower ratios could be used, but there would be no advantage, and calibration would be unduly complicated. Preferably, the ratio should be 10 or greater. The heat expansible material must of course be inert to the casing. It should preferably be non-toxic to humans (when used in a clinical thermometer), and have a low vapor pressure.

Although tricosane-nonadecane mixtures have performance characteristics which are near-ideal over their useful temperature ranges, many other materials can be used. Table II lists a variety of heat expansible materials which have been tested and found satisfactory.

TABLE II

Thermally-Responsive Materials

| Material | Formula | Melting Point |
|---|---|---|
| Organic, Binaries | | |
| n-Tricosane | $C_{23}H_{48}$ | 47.7° C. |
| n-Nonadecane | $C_{19}H_{40}$ | 32 |
| n-Docosane | $C_{22}H_{46}$ | 44.5° C. |
| n-Nonadecane | $C_{19}H_{40}$ | 32 |
| n-Tetracosane | $C_{24}H_{50}$ | 51.1° C. |
| n-Nonadecane | $C_{19}H_{40}$ | 32 |
| p-Dichlorobenzene | $C_6H_4Cl_2$ | 53.0° C. |
| n-Tetracosane | $C_{24}H_{50}$ | 51.1 |
| Naphthalene | $C_{10}H_8$ | 80.2° C. |
| β-Naphthol | $C_{10}H_7 \cdot OH$ | 122 |
| Heptadecane | $C_{17}H_{36}$ | 22.5° C. |
| Tetradecane | $C_{14}H_{30}$ | 5.5 |
| Ditetradecyl Ether | $(C_{14}H_{29})2^0$ | 40.0° C. |
| N-Nonadecane | $C_{19}H_{40}$ | 32 |
| Didodecyl Ether | $(C_{12}H_{25})2^0$ | 33.0° C. |
| n-Nonadecane | $C_{19}H_{40}$ | 32 |
| n-Eicosane | $C_{20}H_{42}$ | 36.5° C. |
| n-Nonadecane | $C_{19}H_{40}$ | 32 |
| Inorganic, Binaries | | |
| Mercuric Iodide | $HgI_2$ | 255.4° C. |
| Mercuric Bromide | $HgBr_2$ | 236 |
| Solder (Lead | Pb | 327.5° C. |
| (Tin | Sn | 231.9 |
| Organic, Multicomponent | | |
| n-Docosane | $C_{22}H_{46}$ | 44.5° C. |
| n-Eicosane | $C_{20}H_{42}$ | 36.5 |
| n-Nonadecane | $C_{19}H_{40}$ | 32 |
| n-Docosane | $C_{22}H_{46}$ | 44.5° C. |
| n-Heneicosane | $C_{21}H_{44}$ | 40.4 |
| n-Eicosane | $C_{20}H_{42}$ | 36.5 |
| n-Nonadecane | $C_{19}H_{40}$ | 32 |
| n-Docosane | $C_{22}H_{46}$ | 44.5 |
| n-Eicosane | $C_{20}H_{42}$ | 36.5 |
| n-Nonadecane | $C_{19}H_{40}$ | 32 |

As may be observed the materials include mixtures of organic compounds (paraffins, aromatics, ethers, phenols, chlorocarbons, etc.), inorganic compounds, and elemental materials such as alloys. Mixtures of steroisomers can also be used as can fusible polymers having molecules of different chain lengths. It is not necessary that the mixtures used have near-ideal phase diagrams such as that for tricosane/nonadecane (FIG. 5). Materials having phase diagrams like those illustrated in FIGS. 8A–8C can be used, so long as care is taken to select the proper proportions to provide a material which melts over a range of temperatures and which expands continuously with increasing temperature within at least part of its melting range. Nor is it necessary that the material be a mixture. For example, a single substance which undergoes crystalline phase changes or constitutional changes during melting, and therefore melts over a range of temperatures, could be used. Furthermore, it is not necessary that the thermally responsive material exhibit a linear temperature expansion curve. A particular material may have an S-shaped curve of the type shown in FIG. 9, yet it can be used to produce a thermometer which has utility merely by affixing the appropriate calibrated non-linear temperature scale. A material may also have an irregular-shaped curve such as that shown in FIG. 15 and still be useful for measuring temperatures within that portion of the melting range where expansion occurs continuously with increasing temperature.

Additives for Heat Expansible Materials

Various materials may be added to the heat expansible materials to enhance particular properties for use in thermometers of this invention. It has been the usual practice to add a small amount of a compatible dye, for example, to increase the visibility of the heat expansible materials in the capillary bore. Usually from 0.1 to 0.5 percent of an oil soluble diazo dye (Du Pont Oil Red, Du Pont Oil Black, Du Pont Oil Blue) has been added to paraffinic heat expansible material before it was introduced into the thermometer. Very fine powders of carbon black, polymers (polyethylene) and metals have also been admixed with the heat expansible materials to improve visibility and/or to improve the thermal conductivity of the mixture.

Another system involves the admixture of fine globules of solid thermally expansive paraffin mixtures with an inert relatively non-expansive liquid such as colored water. An inert liquid for purpose of this invention is one which does not react with or deteriorate the heat expansible material or the casing and which does not dissolve or affect the melting range or expansion characteristics of the heat expansible material to any appreciable extent. Such suspensions may be either of a slurry or a paste consistency. Such admixtures when used in the thermometer expand when the melt temperature of the paraffin globules is reached. It will be obvious to those skilled in the art that a great number of combinations of inert liquids and/or solids with the heat expansible materials may be used depending on the demands of the thermometric application.

Thermometer Casing Materials

The choice of the casing material is dependent on a number of factors such as compatibility with the heat expansible material and the environment, transparency, ease of fabrication, economy, and stability to temperature. Thermoplastic materials are an obvious choice for moderate temperature conditions. Thermoplastics which have been used include polyvinyl chloride, polyethylene, polypropylene, cellulose acetate, nylon, polytetrafluoroethylene, and polymethylmethacrylate. Many other available thermoplastics could be used. Thermosetting resins could also be used but are not as desirable because of greater difficulty of fabrication. Glass casings are particularly useful for higher temperature applications and other ceramic materials such as mica, silica, or silicates can also be used. Even metal casings can be used if a piston arrangement is used to indicate the temperature response on an external scale.

Variations in Configuration of Thermometer

Some variations in the geometry and arrangement of thermometers of this invention are illustrated in FIGS. 10a–h. The numbers 1–5 in these figures represent the same elements as in FIGS. 1–4. Briefly, the particular features depicted are as follows:

FIG. 10a – Shows thermometer with casing 1a, a fill hole 6, used to fill the bulb 3 and capillary 2 with heat expansible material 4, at a position below the upper end. This arrangement allows the scale 5 to be placed at a lower position on the thermometer stem.

FIG. 10b – Shows another arrangement for providing a fill hole 6 below the extreme end. This arrangement is provided by heat pressing a longer sheet with a shorter terminal sheet 10 during the manufacturing process.

FIG. 10c – Shows a plastic tube of uniform cross-section containing the heat expansible material 4. The upper portion of the tube corresponds to bore 2c and the lower portion corresponds to chamber 3c. The tube walls are the casing 1c of the thermometer. Optionally, a tube of small bore used as the capillary 2 can be connected to a tube of larger bore used as the bulb 3. A scale 5c can be placed on the tube or the tube can be placed adjacent a remote scale after use.

FIG. 10d – A bulb-and-capillary 3d and 2 thermometer showing the bulb only partially filled with heat expansible solid 4 and a colored liquid 7 placed above it to act as the indicator fluid.

FIG. 10e – A variation of the thermometer of FIG. 10d in which an ink or mercury plug 9 is placed in the capillary 2 to act as the indicator. An air gap 8 separates the plug 9 from the solid expansible material 4.

FIG. 10f and FIG. 10h – Show thermometers in a compact flat design useful for taking the temperature of a small flat surface such as the human skin or a metal plate.

Figure 4:
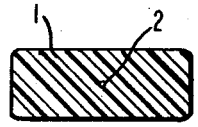

FIG. 10g – A cross-sectional view similar to FIG. 4 showing a magnifier lens 10 integrally molded into the thermometer casing 1g.

It is desirable that the bulb (chamber) have the maximum surface to volume ratio for good heat transfer to reduce the "response time" of the thermometer. In general, cylindrical bulbs of small cross-sections and corresponding longer length are preferable to a sphere from a heat transfer point of view. Other cross-sectional shapes which give a still greater surface-to-volume ratio have been used including rectilinear (flat strip), oval, and blister. A star shaped cross-section would also provide good heat transfer.

Other procedures used to improve the heat transfer include adding carbon or metallic powder to the heat expansible material, and incorporating a heat-conductive porous material, such as a wire screen, in the bulb cavity.

The term "bore" has been used to denote the elongated cavity into which the temperature indicating means rises. The term normally connotes a circular cross-section, but it is not intended to be so restrictive as used herein. Thus, the bore could be triangular, rectangular, or virtually any cross-section. However, circular cross-sections are preferred for ease of forming. It is greatly preferred that the bore be of uniform cross-section along its length, for ease of both formation and calibration.

Processes for Producing Plastic Thermometer Casings

Various processes for preparing thermometer casings are briefly described below:

1. Press Molding

This method, previously described, involves heat pressing two sheets of thermoplastic resin around a tube and a thread or wire to form bulb and capillary cavities in the joined sheets.

2. Sheet Thermoforming

In this method, a thermoplastic sheet is vacuum molded with heating around a bulb and capillary form. The mold sheet is then joined to another flat thermoplastic sheet by heat sealing or cementing to form a casing with a bulb and capillary cavity.

3. Blow Molding

A plastic capillary tube closed at one end is inserted into a mold containing a cavity corresponding to the bulb section of the thermometer. When air is blown under pressure into the hollow capillary of the heated plastic tube, a bulb is formed.

4. Impression Molding

A male mold, comprising a bulb and capillary imprint, is pressed onto a heated PVC plastic strip to form a bulb and capillary impression. The male mold is removed and the open cavity in the plastic strip is sealed off longitudinally with another plastic strip by ultrasonic welding, cementing, or merely a snap fit.

Uses for Thermometers of the Invention

Using this invention, thermometers can be provided for many applications where it is desired to measure temperatures over a limited range. Some of the possible applications of thermometers of this invention include:

1. On frozen food packages to indicate the maximum temperature to which the package has been exposed.
2. On the surface of machine parts, bearings, pipe lines and the like to indicate maximum temperatures.
3. On electronic assemblies to indicate if the maximum safe operating temperature has been exceeded.
4. For checking peak temperatures of inaccessible goods flowing through conveyors and pipe lines.
5. As a multiple ensemble to determine surface temperature profiles such as in the location of tumors beneath the skin in the human body.

Thermometers of this invention intended for clinical use can be made surgically clean by methods known in the art, e.g., treatment with an atmosphere of ethylene oxide.

Example 1

This example illustrates another clinical thermometer having a range of 96° to 106° F.

The casing was prepared according to the procedure described above under the heading Description of the Preferred Embodiment. The bulb dimensions were 18 mils (0.45 mm.) dia. × 31 mm. long and the capillary bore dimensions were 5.4 mils (0.137 mm.) dia. × 45 mm. long. A mixture of two grams of n-nonadecane (obtained from Humphrey Chemical Company and purified by recrystallization from isopentane) and three grams of n-tricosane (obtained from K&K Laboratories, Inc.) were melted and mixed with 0.01 grams of Du Pont Oil Red Dye (to enhance visibility). A portion of the mixture was charged into the thermometer casing and contracted with solidification of the mixture into the bulb and lower capillary section of the thermometer as previously described. A millimeter scale was affixed to the thermometer with the zero index of the scale at the upper position of the contracted binary. The thermometer thus formed was calibrated in a water bath versus a laboratory thermometer contained in the bath with the results shown in FIG. 7. To make the thermometer suitable for re-use, it is merely necessary to solidify and contract the wax mixture back to the bulb section and substitute a temperature scale for the millimeter scale. Also, with the particular system defined, a multiplicity of replicate thermometers can be produced using casings of the same dimensions and using a heat expansible material of the identical composition.

Example 2

This example illustrates a plastic thermometer having a range of 2° to 12° C. (35.6° to 53.6° F.).

Two normal paraffins were selected from melting point data on pure compounds. A mixture was made of equal parts by weight of n-tetradecane (m.p. = 5.5° C.) and hepta-decane (22° C.). About 0.2 percent dye (Du Pont Oil Red) was included so the binary could be detected in a small capillary.

Figure 11:
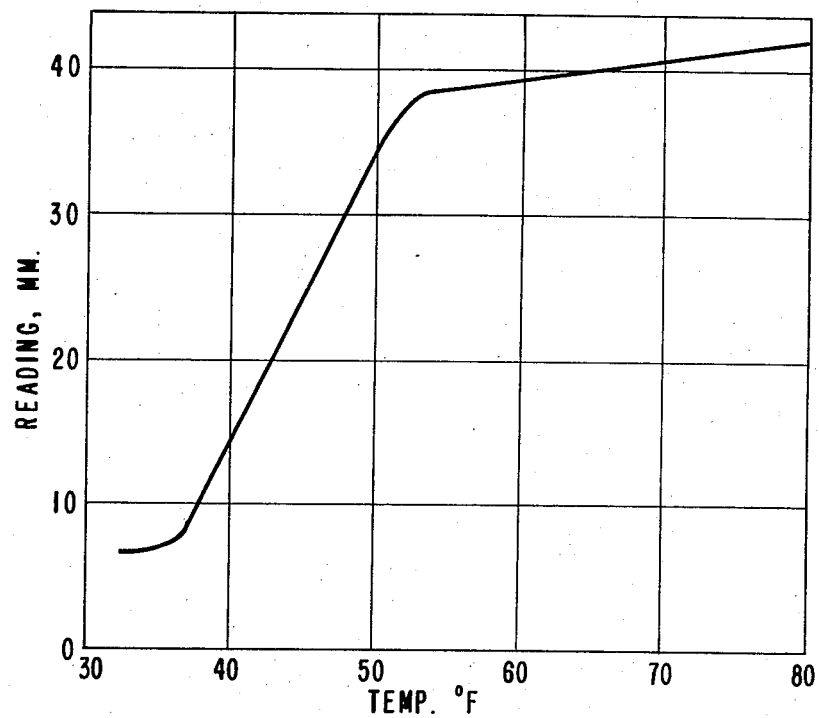

A plastic (clear rigid PVC) thermometer casing was made with bulb of 0.46 mm. (18 mils) diameter and 31 mm. long. The capillary bore was 0.137 mm. (5.4 mils) in diameter and 45 mm. long. By a vacuum process, the plastic thermometer was filled liquid full with the selected binary at room temperature. A 0–45 mm. scale was placed along the capillary. On standing, the liquid level decreased from 45 mm. to 41 mm. in the capillary. By cooling the bulb section in ice water, the scale reading decreased to 7.0 mm. As the water bath temperature was increased from 0° C. to 22° C. over a period of 105 minutes, the scale readings and water temperatures were recorded. FIG. 11 is the calibration curve.

Example 3

This example illustrates a plastic thermometer having a narrow range of 32.5° to 33° C. (90.4° to 91.4° F.) with an expanded scale length for accurate measurement.

Figure 12:
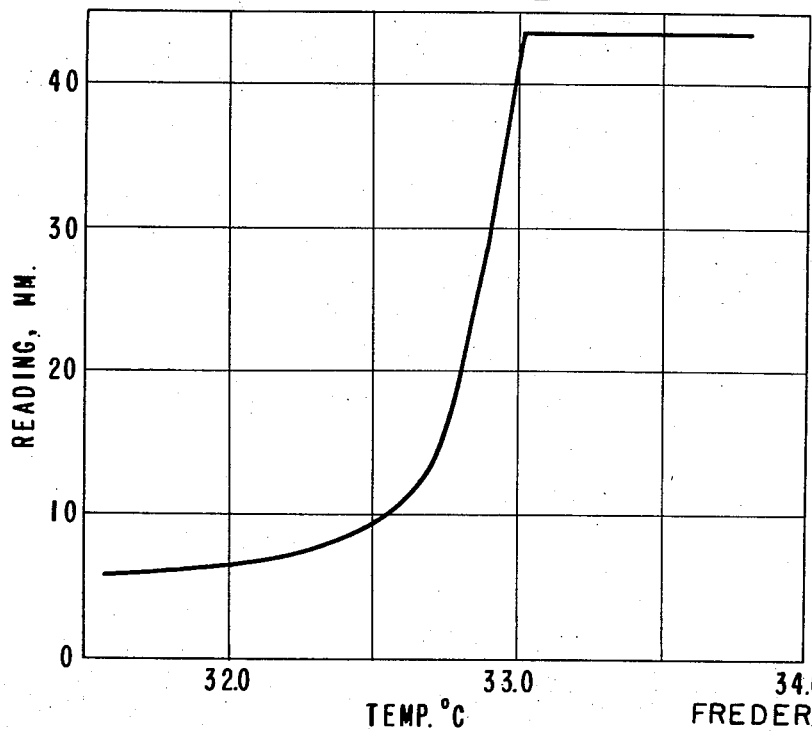

Two normal paraffins were selected that have melting points close together to minimize the melting span. A mixture was made of 0.70 grams of n-nonadecane (32.0° C.) and 0.30 grams of n-eicosane (36.5° C.). Both compounds were carefully purified by fractional crystallization. A plastic (clear rigid PVC) thermometer shell was made with a bulb cavity of 0.46 mm. diameter and 31 mm. long. The capillary section was 0.137 mm. in diameter and 45 mm. long. By a vacuum process, the plastic thermometer was filled liquid full with the selected binary at 43° C. By air cooling the bulb section while the capillary section was submerged in a test tube of colored water in a 43° C. water bath, the binary was solidified in the bulb section. A 0-45 mm. scale was placed along the capillary. The scale reading of the binary-colored water interface was 5.8 mm. at room temperature. The thermometer was calibrated in a carefully programmed water bath from 31° to 34° C. Every five minutes the variac setting, scale reading (interface) and water temperature (by means of a quartz crystal thermometer) were recorded. FIG. 12 gives the calibration curve.

Example 4

This example illustrates a glass thermometer utilizing a mixture of inorganic compounds as heat expansible material, and having a range of about 215° to 235° C. (419° to 455° F.).

A mixture of 25 parts mercuric bromide (m.p. = 236° C.) and 75 parts mercuric iodide (m.p. = 255.4° C.) was melted and solidified. 5.6 grams of the material were placed in the bulb section of a separable Pyrex thermometer. The bulb section had a female ground conical joint for mating with an upper Pyrex section having an extended capillary tube of 1.1 mm. internal diameter. The bulb was fitted to the upper section and the content of the bulb was covered with an inert oil up to the base level of the capillary tube. A millimeter scale was affixed to the capillary tube.

Figure 13:
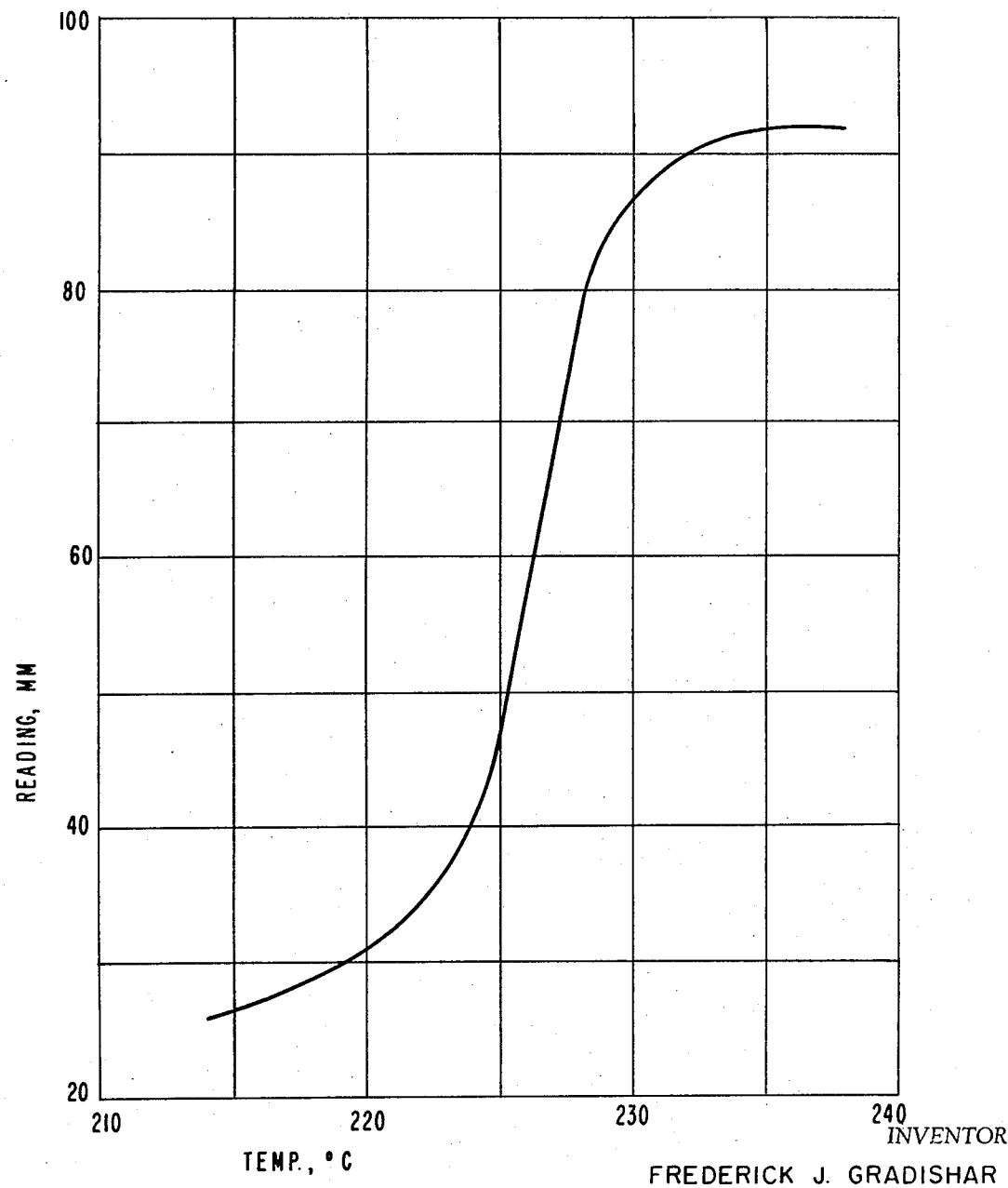

The assembled thermometer was heated in a salt bath together with a mercury thermometer and the position of the top of the oil column was recorded as the temperature was raised at a rate of about ⅓° C. per minute. FIG. 13 gives the calibration curve.

Example 5

This example illustrates a glass thermometer utilizing a mixture of an aromatic and a phenol as heat expansible material, and having a range of about 80° to 95° C. (176° to 203° F.).

Pyrex tubing having an internal diameter of 1.1 mm. was sealed at one end and at that end a spherical bulb of 0.4 cc. capacity was blown.

A solidified mixture from a melt of 60 parts naphthalene and 40 parts beta-naphthol was charged in the bulb and a scale was affixed to the tubing above the bulb. The scale divisions were 1.6 mm. apart.

The assembled thermometer was heated in a water bath beside a reference thermometer and the position of liquid in the capillary was recorded against the reference thermometer as the temperature was raised at about ⅛° C. per minute. FIG. 14 is the calibration curve.

Example 6

This example illustrates a glass thermometer utilizing a metal alloy as heat expansible material, and having a useful range of about 319° to 322° C. (about 606° to 612° F.).

Figure 15:
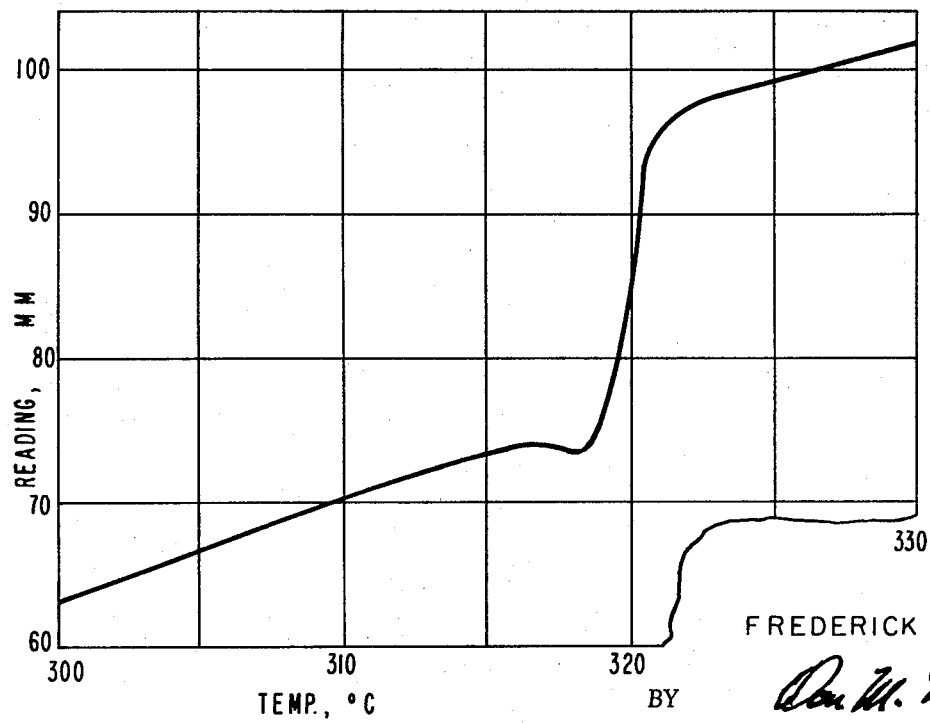

Lead containing 3 percent tin by weight was melted into the bulb of a one-piece blown glass (Pyrex) thermometer. A total weight of 11.06 grams of alloy was employed. This filled the bulb to about 90 percent of capacity when frozen. The remaining space in the bulb was taken up with an inert oil (Krytox fluorinated oil 143AD). The capillary was 1.1 mm. inside diameter. The device was immersed to a point just above the bulb in a melted salt bath and the position of the oil in the capillary was recorded as a function of measured bath temperature as the bath was heated at a rate of about ⅛° C. per minute. FIG. 15 is the calibration curve.

Example 7

This example illustrates another plastic clinical thermometer, with a slightly broader range than the thermometer of Example 1.

A clear rigid PVC thermometer casing was made with a bulb of 0.71 mm. (28 mils) diameter and 14 mm. long and a bore of 0.137 mm. diameter and 50.8 mm. long. Using the vacuum technique, the bulb and bore were filled with a melt consisting of equal weights of n-nonadecane and n-tetracosane at 112° F. The casing was withdrawn from the melt and the bulb was cooled in ice water while the bore was maintained at 112° F. with an infra red lamp, thus causing the binary to freeze and contract. A millimeter scale was attached to the casing so that zero corresponded to the solidified level in the bore.

The bulb cavity was immersed in a water bath next to a comparison mercury thermometer and the bath temperature was raised at 0.2° F. per minute. Thermometric calibration was as follows:

| Temperature, °F. | Scale Reading, mm. |
|---|---|
| 91 | 0 |
| 92 | 0 |
| 93 | 0 |
| 94 | 1 |
| 95 | 5 |
| 96 | 9 |
| 97 | 12.5 |
| 98 | 16.2 |
| 99 | 19.1 |
| 100 | 22 |
| 101 | 24 |
| 102 | 26 |
| 103 | 28 |
| 104 | 30 |
| 105 | 31.5 |
| 106 | 33 |
| 107 | 34 |
| 108 | 34.5 |

I claim:
1. A single use, disposable clinical thermometer for measuring temperatures within the range of clinical interest which comprises:
   an elongated transparent plastic casing having a longitudinal capillary bore which communicates at one end with a chamber of larger cross-section than the bore;
   a temperature indicating means in the chamber comprising a solid, heat-expansible material which melts over the preselected range and expands continuously with increasing temperature within the range, and which
   has a coefficient of expansion over the range which is at least 3 times that of the casing material;
   a graduated scale on the casing adjacent the capillary bore, calibrated to correlate the level of the level of the temperature indicating means within the bore with the temperature of the heat-expansible material when the latter is heated to a temperature within the range.

2. Thermometer of claim 1 wherein the temperature indicating means is a layer of the solid, heat-expansible material under a layer of inert liquid.

3. Thermometer of claim 1 wherein the temperature indicating means consists essentially of the solid heat-expansible material or a slurry or paste of the solid heat-expansible material in an inert liquid, and the bore is of uniform cross-section, said thermometer being inherently of the maximum reading type due to the tendency of the heat-expansible material in contact with the cooler walls of the bore to solidify in a thin layer on the walls.

4. Thermometer of claim 3 wherein the temperature indicating means consists essentially of a solid, heat-expansible material which melts over the range of about 96° to 106° F. and expands linearly with increasing temperature in that range.

5. Thermometer of claim 4 wherein the solid, heat-expansible material is a mixture of paraffins.

6. Thermometer of claim 5 wherein the solid, heat-expansible material is a mixture of approximately 60 parts by weight n-tricosane and 40 parts by weight n-nonadecane.

7. Thermometer of claim 6 wherein the casing is polyvinylchloride.

8. A thermometer for measuring temperatures within a preselected range comprising:
   an elongated, transparent casing having a longitudinal bore;
   a heat-expansible material which expands within the bore with increasing temperatures within the range; and
   a graduated scale for correlating the temperature with the degree of expansion of the heat-expansible material in the bore;
   the heat-expansible material being a solid which:
      melts over a temperature range inclusive of the preselected range;
      expands continuously with increasing temperature within the preselected range; and
      has a coefficient of expansion over the preselected range which is at least 3 times that of the casing material;
   or a slurry or paste of said solid material in an inert liquid, whereby the thermometer is inherently of the maximum reading type due to the tendency of the heat-expansible material in contact with the walls of the bore to solidify in a thin layer on the walls.

9. Thermometer of claim 8 wherein the bore in the casing is of uniform cross section.

10. Thermometer of claim 9 wherein the bore in the casing communicates at one end with a chamber of larger cross section than the bore, which chamber contains the heat-expansible material.

11. Thermometer of claim 10 wherein the heat-expansible material contains a minor amount of a solid particulate heat-conducting material.

12. Thermometer of claim 10 wherein the heat-expansible material contains a minor amount of a coloring agent.

13. Thermometer of claim 10 wherein the solid heat-expansible material extends into the bore.

14. Thermometer of claim 10 wherein the coefficient of expansion of the solid, heat-expansible material over the preselected range is at least 10 times that of the casing material.

15. A thermometer of claim 14 wherein the casing material is glass.

16. A thermometer of claim 14 wherein the casing material is a thermoplastic resin.

* * * * *